United States Patent [19]

Rumble, deceased et al.

[11] 4,308,692
[45] Jan. 5, 1982

[54] DOOR FRAME KIT

[76] Inventors: Roy W. Rumble, deceased, late of London, England; by Zilla K. Rumble, executrix, 20 Green La., Oxhey, Watford, Hartfordshire, England

[21] Appl. No.: 50,594

[22] Filed: Jun. 21, 1979

[51] Int. Cl.³ .............................................. E06B 1/04
[52] U.S. Cl. ........................................ 49/504; 49/382; 52/211; 52/656; 403/231; 403/382
[58] Field of Search ................ 49/382, 504, 380; 52/656, 211, 212, 213, 204; 403/231, 382

[56] References Cited

U.S. PATENT DOCUMENTS

| | | | |
|---|---|---|---|
| 2,799,370 | 7/1957 | Sklar | 52/211 |
| 3,265,427 | 8/1966 | Williams | 49/504 X |
| 3,546,815 | 12/1970 | Kimberly | 49/504 |
| 3,585,770 | 6/1971 | Maizler | 403/231 |
| 3,724,135 | 4/1973 | Heliotes | 49/504 |
| 3,769,773 | 11/1973 | Mochizuki | 52/656 |
| 3,889,423 | 6/1975 | Begin | 52/213 X |
| 4,115,968 | 9/1978 | Majumdar | 49/504 X |

FOREIGN PATENT DOCUMENTS

| | | | |
|---|---|---|---|
| 273100 | 6/1927 | United Kingdom . | |
| 310644 | 5/1929 | United Kingdom . | |
| 1111238 | 4/1968 | United Kingdom | 49/504 |
| 1132210 | 10/1968 | United Kingdom . | |
| 1380742 | 1/1975 | United Kingdom . | |
| 1384337 | 2/1975 | United Kingdom . | |
| 1507136 | 4/1978 | United Kingdom . | |

Primary Examiner—Philip C. Kannan
Attorney, Agent, or Firm—Bacon & Thomas

[57] ABSTRACT

A door frame kit comprises two stiles, a threshold member, and a lintel member, each stile preferably being engageable with said members irrespective of which end of the stile is uppermost. Each stile has a pair of flanges at at least one end. Each flange, which has a transverse projection, is insertable through a corresponding longitudinal opening in said one member, the stile and said one member abutting when the flange is so inserted. The other end of each stile is securable to the other member to complete a door frame.

7 Claims, 9 Drawing Figures

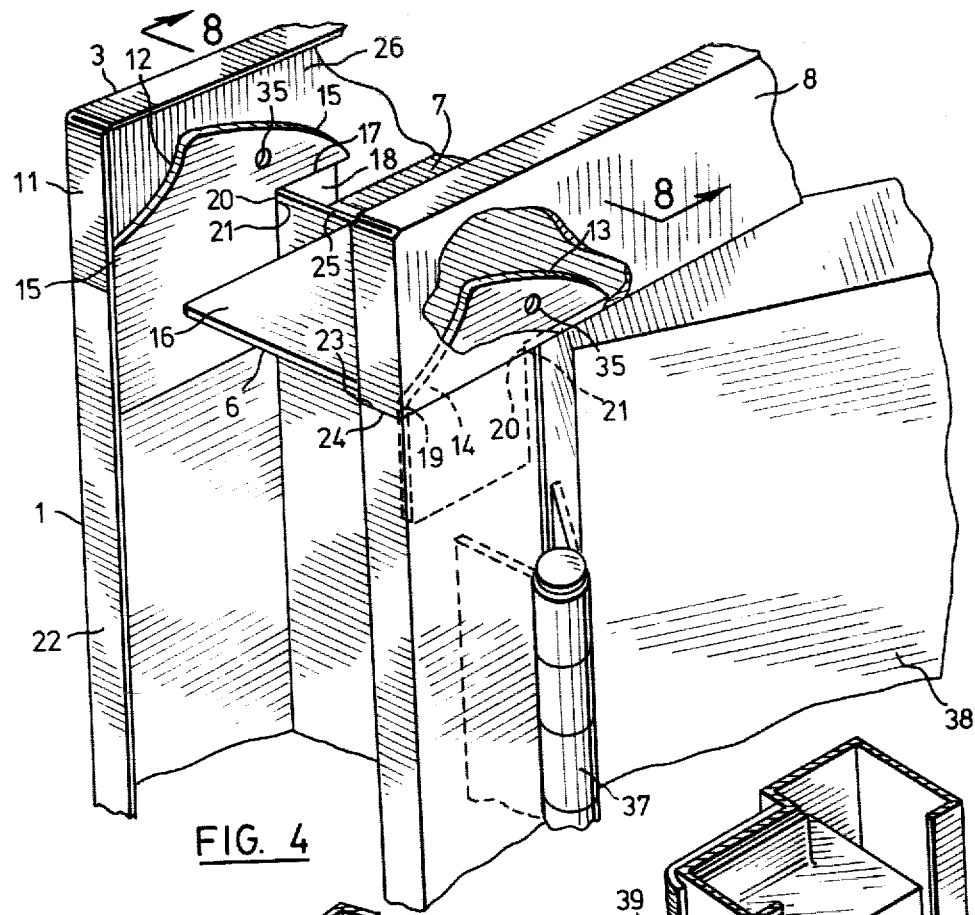
FIG. 4
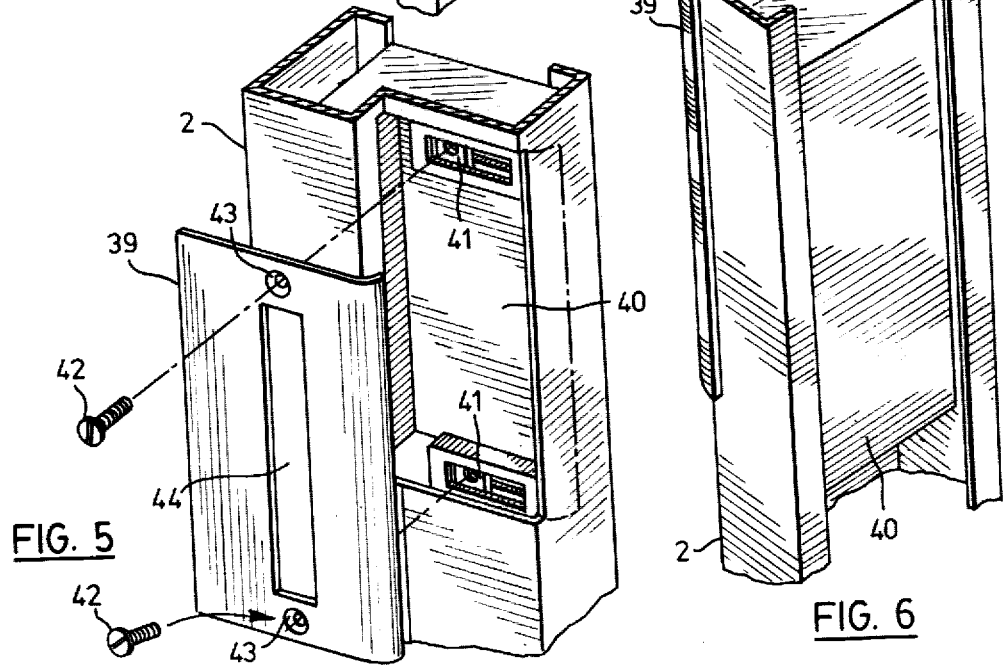
FIG. 5
FIG. 6

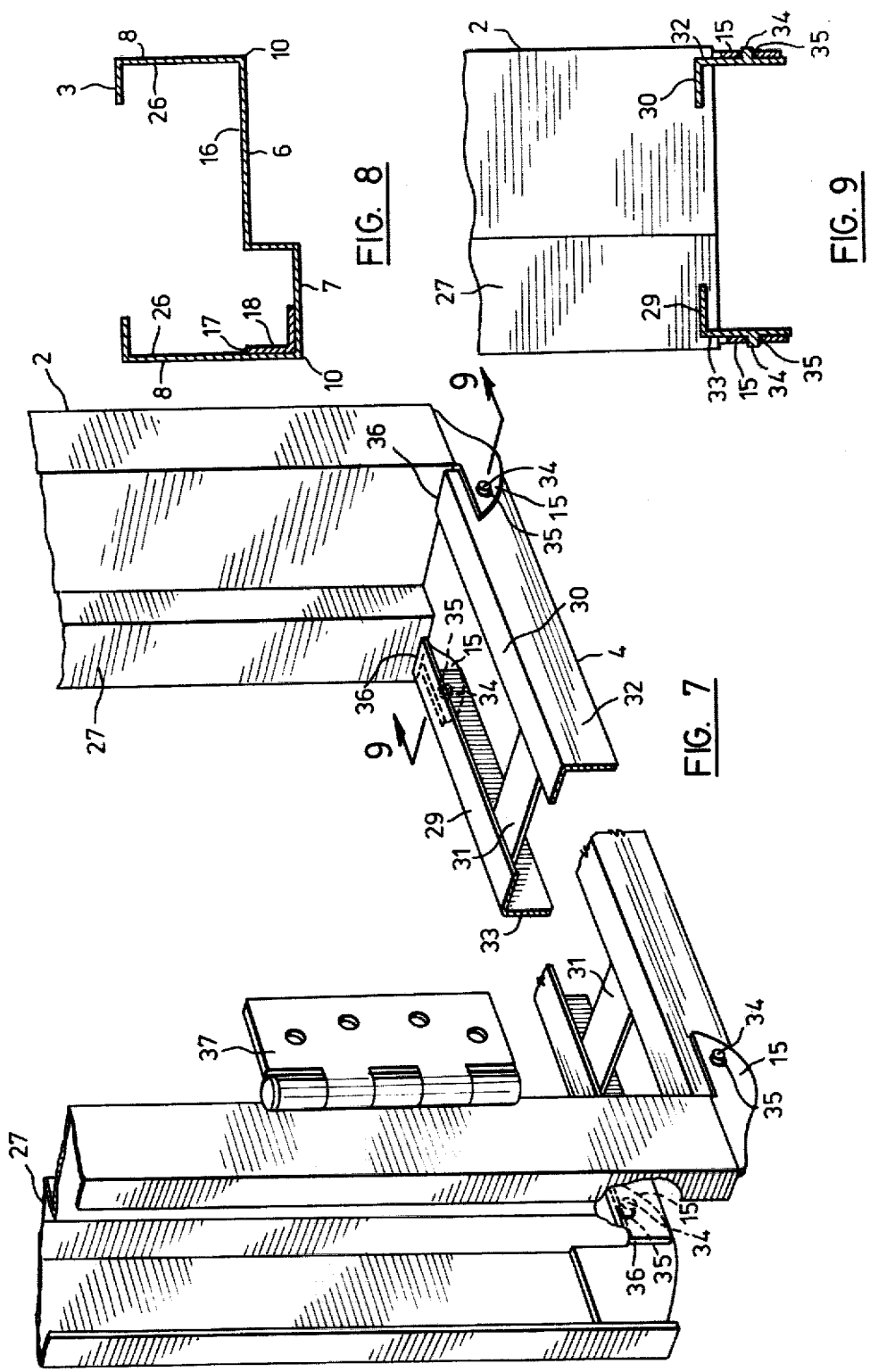

DOOR FRAME KIT

BACKGROUND OF THE INVENTION

1. Field of the Invention

This invention relates to the connection of members at right angles to one another, and is particularly suited for constructing door frames.

2. Description of the Prior Art

It has been proposed to ship elements of a metal door frame to a work site where they can be assembled on the job. For example, in U.S. Pat. No. 3,769,773 to Mochizuki, dated Nov. 6, 1973, a door frame comprising a pair of stiles, a lintel member and a threshold member is disclosed, but one of the difficulties with the arrangement disclosed is that the components do not fully capture one another when fitted together, so that supplemental fixing screws are used, and the stiles are not invertible.

SUMMARY OF THE INVENTION

The present invention consists of a kit which preferably comprises two stiles, a threshold member, and a lintel member, each stile being engageable with said threshold and lintel members. Each stile has a pair of rigid, parallel flanges at at least one end. Each flange, which has a neck portion extending rigidly from the end of the stile and a transverse projection from but one side of the neck, is rotatably insertable through a corresponding longitudinal opening in one of said members whereby, when the flange is inserted through said opening, the neck is engaged in the opening to prevent horizontal movement of the stile relative to said one member and the projection engages an inner generally horizontal surface of said one member. The projections of both flanges of the stile extend in the same direction longitudinally of said one member. The stile and member abut, thereby preventing relative vertical movement. The other end of each stile is securable to the other member to complete a rectangular frame. Each stile preferably has, at said other end, a pair of flanges engageable with said one member in the same manner as the flanges at its said one end, whereby each stile is engageable with said one member irrespective of which end of the stile is uppermost.

When one of the flanges is inserted through an opening, the projection can frictionally engage an inner side surface of the member to inhibit swinging movement of the stile relative to the member. When the projection engages the horizontal surface of the member, the member and stile abutting, outward swinging movement of the stile relative to the member is prevented.

The slotted member can have transversely bent portions at its ends to define an end of each opening in the member and, when the stile and member abut, the transversely bent portions align with and abut corresponding transversely bent portions of the stile.

The threshold member can have sides frictionally engageable with sides of the flanges, protrusions on the threshold sides being receivable, when the stile is normal to the member, within an aperture in each flange whereby securement to complete the door frame is achieved.

One stile of a door frame kit can have door hinges thereon, the other stile having a striker plate which is engageable, irrespective of which end of the stile is uppermost, with a lock mechanism of a door mounted on the hinges of said one stile.

The lintel member is preferably channel-shaped, having a bottom and two sides. Openings in the lintel member are located in the bottom adjacent an edge formed by each side with the bottom. The lintel member can have an inwardly offset portion with a cut-out at each end of the offset portion, which cut-out is engageable with a corresponding inwardly offset portion in each stile to define a door jamb, one flange at the end of each stile being located on the offset portion of the stile and being inwardly offset relative to another flange at the same end of the stile.

Each stile can rigidly capture the lintel and threshold member when fitted thereto. Stiles can be interchanged with each other by inverting them because it does not matter which end of a stile is uppermost. Therefore, the same door frame kit can be used to construct a frame with a door that opens from the left or right hand side of the frame.

BRIEF DESCRIPTION OF THE DRAWINGS

A preferred embodiment of the invention is illustrated by way of example in the accompanying drawings in which:

FIG. 4 is a perspective view of the parts shown in FIG. 3 after assembly and with a door installed;

FIG. 5 is an exploded perspective view showing a form of securing a striker plate to a stile;

FIG. 6 is a rear perspective view of a striker plate box within a stile;

FIG. 7 is a perspective view of parts of two stiles and the threshold member after assembly;

FIG. 8 is a sectional view along the line 8—8 of FIG. 4; and

FIG. 9 is a sectional view along the line 9—9 of FIG. 7.

DETAILED DESCRIPTION OF THE PREFERRED EMBODIMENT OF THE INVENTION

Figure 1:
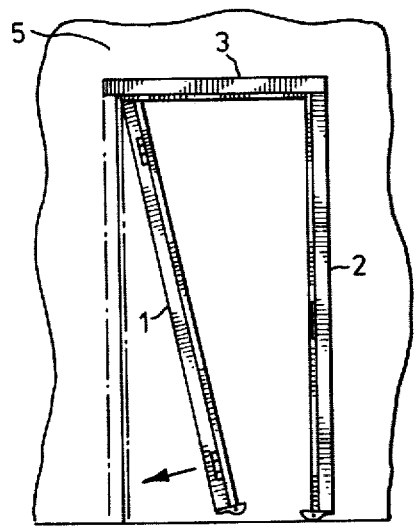
FIG. 1 is a front view of a door frame kit during one form of assembly, showing a lintel member in place in a wall opening, an installed right-hand stile, and a left-hand stile being installed to come to rest in the position shown by the broken lines.
Figure 2:
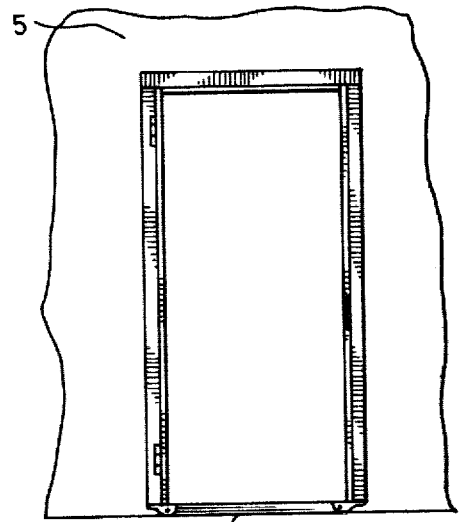
FIG. 2 is a front view of the door frame kit after assembly, further showing an installed threshold member.
Figure 3:
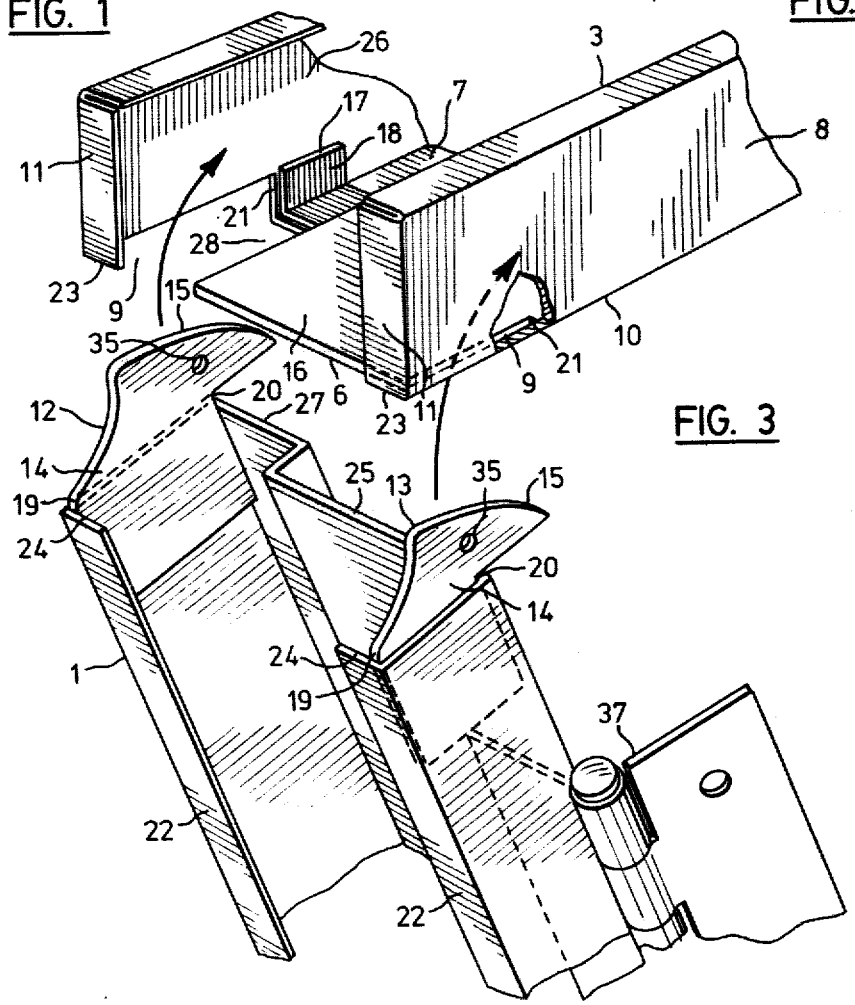
FIG. 3 is an enlarged perspective view of parts of a stile and lintel member during assembly.

A door frame kit, preferably made entirely of metal, comprises two stiles 1 and 2, a lintel member 3, and a threshold member 4, as shown in FIGS. 1 and 2, each stile being engageable with said lintel and threshold members 3 and 4 respectively to complete a door frame in wall 5. It is to be noted that a door frame can be assembled in place in wall 5 as shown in FIG. 1, or it can be pre-assembled for subsequent insertion into a wall opening. As will be discussed later, stiles 1 and 2 can be interchanged with each other by inverting them so that striker plate 39 is located on the left hand side of the door frame. Lintel member 3 is channel-shaped, having a bottom 6 with an inwardly offset portion 7, as shown in FIG. 8, and two sides 8. As shown in FIG. 3, longitudinal openings or slots 9 are located in bottom 6 adjacent an edge 10 formed by each side 8 with the bottom. Defining one end of each opening 9 are transversely bent portions 11 at the ends of the lintel member.

Secured to each end of the stiles are rigid, parallel flanges 12 and 13, each having a neck 14 and a transverse projection or beak 15 extending from only one side of the neck. To assemble a stile with the lintel member, the stile is held at an acute angle to the lintel member as shown in FIGS. 1 and 3, the projections 15 are inserted through corresponding openings 9 and the stile is rotated outwardly, until it forms a right angle with the lintel member. The projections 15 then both extend in the same direction away from the end of the lintel member and engage interior horizontal surfaces 16, 17 of the lintel member, the surface 17 being provided by an angle insert 18 secured to the inside of the lintel member. Neck 14 of each flange 12 and 13 is fully received within its corresponding opening 9. The distance between the edges 19 and 20 of each neck are the same as the lengths of openings 9, so that edge 19 engages transversely bent portion 11 and edge 20 engages edge 21. The transversely bent portions 11 are aligned with and abut corresponding transversely bent portions 22 of the stile, edges 23 of portion 11 engaging edges 24 of portion 22. The top edge 25 of the stile engages the bottom 6 of the lintel member and as already noted the projections 15 engage the generally horizontal surfaces 16, 17 of the lintel member. With the stile and lintel member thus abutting as shown in FIG. 4, further outward rotation of the stile is prevented. The flat sides of the projections 15 frictionally engage the sides 26 of the lintel member to resist relative movement of the stile and lintel member.

As already noted with reference to FIG. 8, lintel member 3 has an inwardly offset portion 7, and this forms a step in the bottom 6 of the lintel member. A corresponding inwardly off-set portion 27, as shown in FIG. 3, is provided in the stiles, said offset portions being receivable within cut-outs 28 at each end of offset portion 7. When the stiles and lintel member abut, the offset portions 7 and 27 define an inwardly stepped door jamb.

As shown in FIG. 3, the flange 12 is secured to the stile on the offset portion 27 and as a result its projection 15 is inwardly offset relative to the projection 15 of flange 13 in order to fully engage the horizontal surface 17 of the lintel member.

FIG. 7 shows an arrangement for securing the stiles to the threshold member whereby threshold member 4 consists of a pair of parallel angle members 29 and 30 rigidly connected by transverse braces 31. The angle members have sides 32 and 33 with protrusions 34 thereon. Sides 32 and 33 are spaced apart such a distance that when an end of each stile is to be engaged by the threshold member the sides 32, 33 frictionally engage the inside flat surface of the projections 15. The projections 15 of the stiles have apertures 35 therethrough, and the projections can be forced over the protrusions 34 until the protrusions pop in to the apertures 35, when the stiles 1 and 2 are normal to the threshold member, thereafter resisting movement of the stiles relative to the threshold member. The ends 36 of the angle member 29 and 30 then abut the vertical stiles.

Stiles 1 and 2 are of the same construction at each end, so that the stiles can be engaged with lintel and threshold members 3 and 4 respectively, irrespective of which ends of the stiles are uppermost. If desired, also, the stiles could be connected to the threshold member by an arrangement such as that of FIG. 3, using an arrangement as in FIG. 7 to connect the stiles to the lintel member.

A pair of door hinges 37 are provided on stile 1, for mounting a door 38 so that the door opens from the left-hand side of the frame as viewed in the drawings. However, the stiles can be interchanged by inverting them and locating stile 1 on the right hand side of the frame so that the same kit can provide a door frame with hinges mounted at either side.

A striker plate 39 is secured to stile 2, as shown in FIGS. 5 and 6. Within stile 2 is a striker plate box 40 having a pair of transversely adjustable nuts 41. A pair of bolts 42 pass through apertures 43 in the striker plate 39 and are threaded into the nuts 41. After the striker plate is transversely positioned on the stile so that striker plate slot 44 is engageable with the locking mechanism of a door, the bolts 42 are tightened. Because a door's locking mechanism is located on an edge of the door slightly below its mid-point, striker plate slot 44 is sufficiently long that it is engageable with said locking mechanism, irrespective of which end of the stile is uppermost. There is therefore no problem about inverting the stile 2 and interchanging it with the stile 1.

A striker plate 39 and box 40 can be secured to the stile in other manners, for example, by mounting them at one of several knock-out portions along the stile.

Modifications within the scope of the following claims will readily occur to those skilled in the art.

What I claim is:

1. A kit comprising two stiles, a threshold member, and a lintel member, each stile being engageable with said threshold and lintel members, each stile having a pair of rigid, parallel flanges at one end, each flange having a neck portion extending rigidly from the end of the stile and a transverse projection from but one side of the neck, and being rotatably insertable through a corresponding longitudinal opening adjacent an end of one of said members whereby, when inserted through said opening, the neck is engaged in the opening to prevent horizontal movement of the stile relative to said one member, the projection extends away from said end of said one member and engages an inner generally horizontal surface of said one member, the stile and said one member abutting when the projection of the flange is so engaged thereby preventing vertical movement of the stile, the other end of each stile being securable to said other member to complete a rectangular frame, each stile having, at said other end, a pair of rigid flanges engageable with said one member in the same manner as the flanges at its said one end, whereby each stile is engageable with said one member irrespective of which end of the stile is uppermost.

2. A kit according to claim 1 wherein said engagement of each projection with said interior generally horizontal surface and said abutment of the stile with the lintel member prevents outward rotation of the stiles relative to the lintel member.

3. A kit according to claim 1 wherein the lintel member has an inwardly offset portion with a cutout at each end of said portion engageable with a corresponding inwardly offset portion in each stile to define a door jamb, one of the flanges at the ends of each stile being located on the offset portion and being inwardly offset relative to another flange at the same end.

4. A kit according to claim 1 wherein the lintel member has transversely bent portions at its ends to define ends of the openings and, when each stile and the lintel member abut, the transversely bent portions are aligned with and abut corresponding transversely bent portions of said stiles.

5. A kit comprising two stiles, a threshold member, and a lintel member, each stile being engageable with said threshold and lintel members, each stile having a pair of flanges at one end, each flange having a neck portion extending from said one end of the stile and a transverse projection, and being rotatably insertable through a corresponding longitudinal opening in one of said members whereby, when inserted through said opening, the neck is engaged in the opening to prevent horizontal movement of the stile relative to said one member, the projection engages an inner generally horizontal surface of said one member, the stile and said one member abutting when the projection of the flange is so engaged thereby preventing vertical movement of the stile, the other end of each stile having a pair of flanges securable to said other member to complete a rectangular frame, said other member having sides which are frictionally engageable with sides of the latter flanges and having protrusions receivable within apertures in each of the latter flanges when the stile is normal to said member, whereby said securement to complete the door frame is achieved.

6. A kit according to claim 5, wherein the flanges at said other end of each stile are engageable with said one member in the same manner as the flanges at its said one end, whereby each stile is engageable with said one member irrespective of which end of the stile is uppermost.

7. A kit according to claim 5 or 6, wherein the projection of each flange can frictionally engage a side of said one member to inhibit swinging movement of the stile relative to said one member when the projection is so engaged.

* * * * *